Aug. 21, 1956  G. JENDRASSIK  2,759,660
PRESSURE EXCHANGERS
Filed Sept. 18, 1950  7 Sheets-Sheet 1

Inventor
George Jendrassik
By Stevens, Davis, Miller & Mosher
his Attorneys

Aug. 21, 1956  G. JENDRASSIK  2,759,660
PRESSURE EXCHANGERS
Filed Sept. 18, 1950  7 Sheets—Sheet 2

Inventor.
George Jendrassik
By
Stevens, Davis, Miller & Mosher
his Attorneys

Aug. 21, 1956  G. JENDRASSIK  2,759,660
PRESSURE EXCHANGERS
Filed Sept. 18, 1950  7 Sheets-Sheet 5

Inventor.
George Jendrassik
By
Stevens, Davis, Miller & Mosher
his Attorneys

Aug. 21, 1956  G. JENDRASSIK  2,759,660
PRESSURE EXCHANGERS
Filed Sept. 18, 1950  7 Sheets-Sheet 6

Inventor
George Jendrassik
By
Stevens, Davis, Miller & Mosher
His Attorneys

United States Patent Office 2,759,660
Patented Aug. 21, 1956

2,759,660

PRESSURE EXCHANGERS

George Jendrassik, London, England; Andre G. T. Boszormenyi and Clara Jendrassik, executors of said George Jendrassik, deceased, assignors, by mesne assignments, to Jendrassik Developments Limited, London, England Application September 18, 1950, Serial No. 185,464

Claims priority, application Great Britain September 20, 1949

10 Claims. (Cl. 230—69)

This invention relates to rotary pressure exchangers (for gaseous fluids) of the kind which comprise at least one ring of cells for the compression or expansion of gas, and in which, when in operation (at which time there is relative rotation between the ring of cells and adjacent structure) cells containing compressed gas are placed into communication with other cells (of the same or another ring) containing gas at a lower pressure, so that the compressed gas expands and thereby effects compression of gas in the other cells, the compression and expansion stages thus constituted being associated with heat input and heat rejection stages involving the flow of gas into, and/or out of, the cells to compensate for the changes in volume arising from the change in heat content.

While a compression stage cell is in communication with an expansion stage cell there is necessarily a flow of gas (hereinafter called "transfer gas") from the cell in which gas is expanding to the cell in which gas is being compressed.

The gas flow arising at a heat input stage need if possible be no more than the removal from the cells of surplus gas resulting from the increase in volume which arises from heating, and similarly, the gas flow arising at a heat rejection stage need if possible be no more than the addition of gas to the cells to make up for loss in volume resulting from cooling.

In practice it is a convenient expedient for at least the heat rejection (and possibly also the heat input) to occur externally of the cells, and to this end it has been proposed for the gas flow associated with the heat rejection and heat input stages to be effected by the process (hereinafter called "scavenging") by which each cell entering the heat input (or heat rejection) zone has its gas content removed and replaced by the other gas which, externally of the cells, has been specially heated (or cooled), or which in either case is derived from a source of gas which is already at the desired high (or low) temperature, this process of removal and replacement involving a continuous current of gas flowing through the cells in which it is occurring.

The points in the working cycle at which heat input and heat rejection take place depends on the intended use of the machine. If the pressure exchanger is for use as a source of high pressure hot gas (e. g. for expansion in a gas turbine, or other engine, to provide mechanical work), then heat input occurs at high pressure and heat rejection at low pressure. On the other hand if the pressure exchanger be for use as a heat pump, or a refrigerating machine, then the converse is the case (i. e. heat input at low pressure, heat rejection at high pressure).

Conveniently, each ring of cells may form a rotor. Where more than one such rotor is used matters may be so arranged that the flow of transfer gas is from expansion cells of one rotor to compression cells of another rotor.

The present invention has for its general object to reduce the energy losses inherent in such pressure exchangers. In particular it arises from the realisation that the transfer gas in flowing from one cell to another (possibly through special ducting) necessarily undergoes some free expansion which does no useful work by compressing gas in a compression cell, and therefore represents an energy loss.

Accordingly the present invention provides a pressure exchanger of the kind referred to in which the flow of transfer gas is passed through turbine blading or the equivalent so that a portion of the energy of such gas is extracted in the form of mechanical work. Such mechanical work may be applied to rotate or assist in rotating, the rotor or rotors of the pressure exchanger, and possibly also to provide external shaft power.

Within its broad scope the present invention may also provide a pressure exchanger of the kind referred to, and comprising at least one rotor which (possibly in association with non-rotary structure) provides a ring of cells, wherein the rotor structure includes turbine blading which, in operation, receives the transfer gas passing from expansion cells to compression cells. There is then preferably provided a system of stator blading designed and arranged so that it receives transfer gas discharged by the rotor blading of an expansion cell and appropriately guides the delivery of such gas to the rotor blading of a compression cell (whether in the same rotor or another).

Matters may be so contrived that the mechanical work derived from the blading is merely adequate to drive the rotor or rotors, or alternatively it may be sufficient both to drive the rotor or rotors and also to deliver some external power through the rotor shaft or shafts, the remainder of the useful work of the pressure exchanger being expended in providing a supply of high pressure gas for external use, e. g. in a separate turbine. The arrangement may be such that the total work done by the pressure exchanger is divided in any desired proportion between the provision of a supply of compressed gas for external use, and mechanical work extracted from the transfer gas in the form of shaft power. In an extreme case the whole of the externally useful work may be extracted as shaft power, and substantially no compressed gas delivered for external use. It may be considered preferable however for the pressure exchanger to provide only sufficient mechanical energy to utilise the heat which would in any case be lost to the pressure exchanging process. Such energy besides being used to drive the cell rotor or rotors, may conveniently be applied to drive auxiliaries such as scavenging fans or compressors, or boosting compressors which provide pressure gas for scavenging.

Preferably pressure exchangers according to the invention are so designed that, in operation, communication between a compression cell and an expansion cell is severed before the flow of transfer gas has ceased.

Examples of pressure exchangers according to the present invention will now be described with reference to the accompanying diagrammatic drawings. The particular examples which will be so described will all be cases where each ring of cells is comprised in a self-driving rotor and the cells are scavenged both at the heat input and at the heat rejection stages. For convenience it will be assumed in the following description that the machines described are designed to provide a supply of hot gas under pressure.

Figure 1:
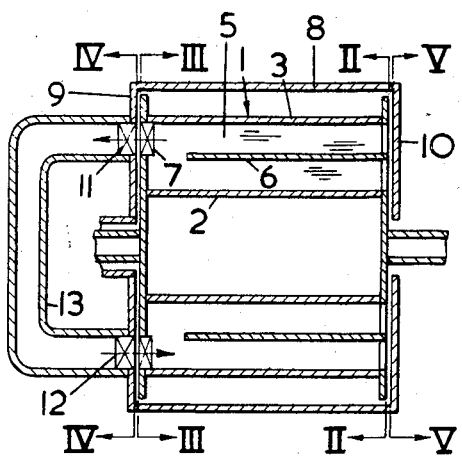
Figure 1 is an axial section through a single rotor type of pressure exchanger on the line I—I in Figure 4.
Figure 2:
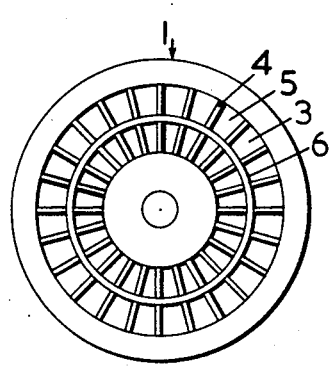
Figure 2 is a transverse section on the line II—II in Figure 1 and shows one end of the rotor.
Figure 3:
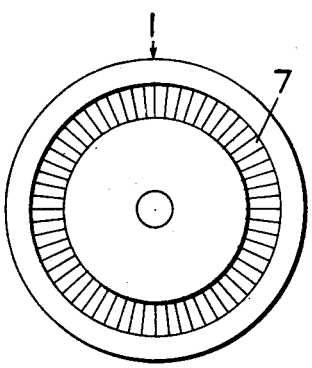
Figure 3 is a similar section on the line III—III in Figure 1 and shows the other end of the rotor.

The pressure exchanger shown in Figures 1 to 7 comprises a rotor 1 formed of inner and outer cylinders 2, 3 which are separated by radial partitions 4 to form cells 5. In the particular example shown reverse flow scavenging is to be used (as described hereinafter), and hence the rotor also embodies a cylindrical partition 6 which divides the cells into radial inner and outer portions. The rotor is provided in one end face thereof with a ring of turbine rotor blading 7, the cells 5 being closed at that end except for the passages provided by the blading. At the other end the cells 5 are open as shown in Figure 2.

The rotor is enclosed for rotation within an outer casing 8 having end plates 9 and 10 of which the plate 9 is provided with arcs of stator blading 11, 12 the gas passages of which blading communicate with pipes 13 for the transfer gas flow. There may be several blading passages in communication with one cell and each pipe 13 may also communicate with more than one blading passage, so long as in operation there is no communication between cells except where necessary for the pressure exchange process.

Assuming the rotor to be rotating clockwise in Figure 4 the working cycle is as follows:

AD is the expansion stage, DC is the low pressure scavenging stage at which heat rejection occurs, CB is the compression stage and BA is the high pressure scavenging stage at which heat input occurs.

Figure 7:
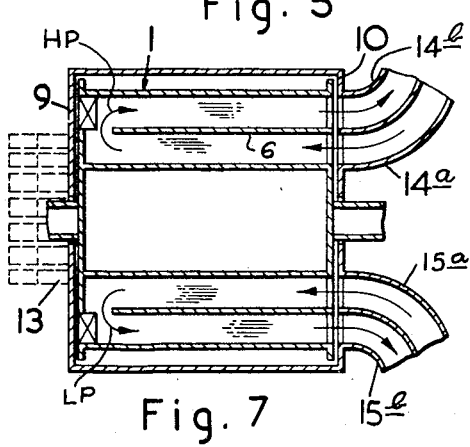
Figure 7 is a section similar to Figure 1 but taken on the line VII—VII in Figure 4 that is, an axial plane at right angles to the plane I—I in Figure 4.

The scavenging apertures in the end plate 10 are connected to suitable ducting as shown in Figure 7 in which 14 is the high pressure scavenging duct and 15 is the low pressure scavenging duct. In the present case it is assumed that the gas discharged at high pressure scavenging undergoes heat input externally, for example by having fuel burnt in it in a combustion chamber and is thereafter divided into two portions of which one is conducted back to the pressure exchanger to re-charge the cells at high pressure scavenging, and the other is supplied to a point of use such as a separate gas turbine plant.

Figure 8:
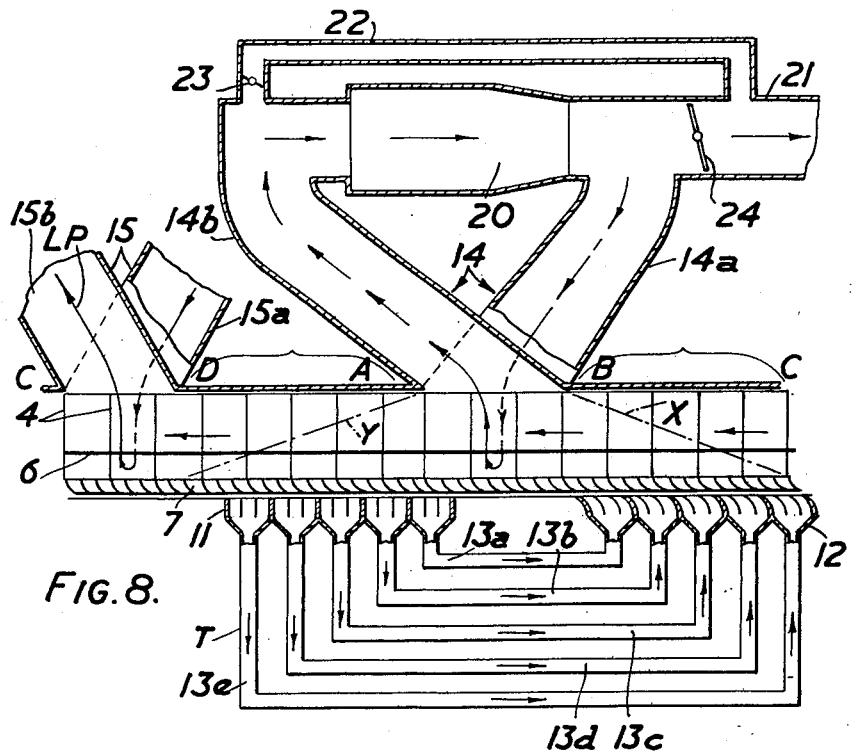
Figure 8 is a diagram showing a development of the rotor in Figure 1 in a circumferential plane and associated parts of the pressure exchange plant.

The general layout and operation of the machine described above with reference to Figures 1–7 may be conveniently appreciated from Figure 8 which is a complete circumferential development of the rotor and associated parts. The rotor is rotating from right to left. Starting at the low pressure scavenging zone DC, fresh air at atmospheric pressure is supplied by the duct 15a and fills the cells registering with the latter, sweeping out of these cells exhaust gas which is discharged through the duct 15b. Each cell is divided by the partition 6 into a radially inner and a radially outer part (see also Figures 1 and 7). The fresh air is led by the duct 15a to the inner part of the cells, and the exhaust gas is taken from the outer part of the cells by the duct 15b, so that the path of the resultant gas current, which sweeps through the cells as indicated by the arrows LP in Figures 7 and 8, undergoes a reversal of flow. For brevity this process will be called "reverse flow scavenging." It is further referred to in applicant's copending application No. 181,846.

The cells registering with the high pressure scavenging ducting 14 in the zone BA, will now be considered. The radially inner parts of these cells communicate with the inlet duct 14a and the radially outer parts with the outlet duct 14b (see also Figure 7). The duct 14b leads to a combustion chamber 20 the outlet from which branches into the pipe 21 which supplies the high pressure hot gas representing in this case the useful output of the machine, and the duct 14a already referred to. Cells moving from right to left and about to register with the zone BA contain gas, which, as explained below, has been compressed in the pressure exchanger to a pressure substantially above atmospheric. When these cells reach the zone BA they discharge their contents into the duct 14b. In the compressed air so supplied fuel is burnt in the combustion chamber 20 (e. g. by injecting liquid fuel). Of the resultant hot gases of combustion, which are at a high pressure a part is supplied by the duct 21 to a point of use. In the present case such gas is assumed to be supplied to a gas turbine in which it is expanded to provide shaft power. The remaining part of the hot gases is led by way of the duct 14a to fill the cells in the zone BA in replacement for the compressed gas mentioned above. It will be appreciated that when the machine is working combustion in the chamber 20 is continuous and there is in the high pressure scavenging zone BA a continuous gaseous current sweeping through the cells, which deliver compressed gas and are refilled with high pressure combustion gases. In this case also the scavenging is of the "reverse flow" type, see arrows HP.

Cells in the "expansion" zone AD communicate with cells in the "compression" zone CB by way of pressure exchange pipes 13. A cell just leaving the zone BA and containing gas at the highest pressure of the cycle comes into communication with the pipe 13a which connects it momentarily to a cell at somewhat lower pressure in the zone CB. During this momentary connection the pressure difference between the two communicating cells decreases or equalizes (or approximately so), which necessarily involves a small flow of gas along the pipe 13a in the direction of the arrows, from the "expansion" cell to the "compression" cell. This flow of gas is, for brevity, called "transfer gas" (see arrows T). Due to the so-called "pressure exchange" which has occurred between the inter-connected cells, the cell in the zone AD has undergone a drop in pressure while the cell in the zone CB has experienced a rise in pressure.

The cell in zone AD selected for consideration moves on and by way of the pipe 13b, is connected to another cell in the zone CB, so that a similar exchange of pressure takes place between these cells. The same process takes place each time a cell in zone AD connects with one of the pipes 13a—e. The result is that the gas content of a cell passing from A to D experiences successive steps of expansion, ending at the exhaust pressure, while simultaneously the gas content of a cell passing from C to B experiences successive steps of pressure rise, ending at or near the pressure of the air discharged at 14b. The cells standing at any given moment in the "compression" zone CB are at a pressure which increases by steps in the direction C to B, as indicated diagrammatically by the chain line X, while the cells in the expansion zone AD are at a pressure which falls by steps in the direction A to D, as indicated by the chain line Y. It may be necessary to employ fans in the ducting 14, 15 to promote the scavenging flow. It should also be noted that in designing a practical machine it is desirable to dimension the openings of the pipes 13 so that there is no leakage between adjacent cells in the compression or expansion stage.

A by-pass duct 22 is provided with a valve 23, to permit of varying the quantity of air passing through the combustion chamber. A valve 24 is also provided to vary the quantity of combustion gas which flows to the ducts 21 and 14a.

Figure 9:
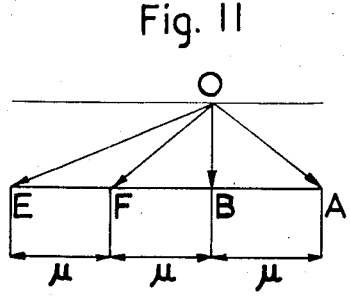
Figure 9 is a velocity diagram corresponding to the turbine blading shown in Figure 8.

It will be seen from Figure 8 that the rotor blading 7 operates as reaction blading with respect to transfer gas leaving the cells I i. e. those under expansion, and as impulse blading with respect to the gas entering the cells II i. e. those under compression. The stator blading 11, 12 is so designed that with the minimum of energy lost it receives transfer gas discharged from the cells and appropriately guides the delivery of such gas to the rotor blading of a compression cell. Figure 9 is a typical velocity diagram for the blading shown in Figure 8, the notation being as follows:

U—peripheral speed
OA—velocity of gas relative to rotor when leaving cells I
OB—velocity of gas relative to stator blading when entering same
OE—velocity of gas relative to stator when leaving the latter to enter cells II
OF—velocity of gas relative to rotor on entering cells II
OB—velocity relative to rotor of gas entering cells II, after leaving the rotor blades.

Figure 9A:
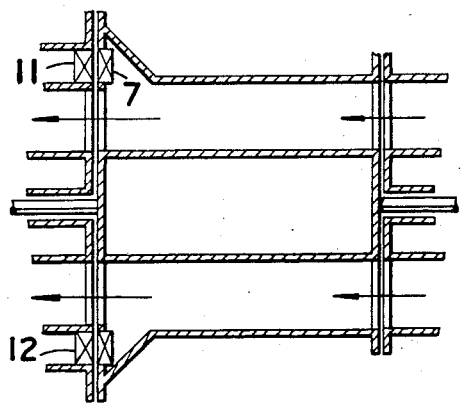
Figure 9A shows a modification of Figure 1.

Figure 9A shows a machine similar to Figure 1 but in which the cells and end plates have scavenging openings at each end to permit the use of straight through axial scavenging i. e. without 'reverse flow.' In this case the rotor blades 7 are arranged in a portion of the rotor which is of larger diameter so that the flow of scavenging gas can by-pass the blading at a radially inward zone. The stator blading 11, 12 is necessarily also located on a larger diameter.

Figure 10:
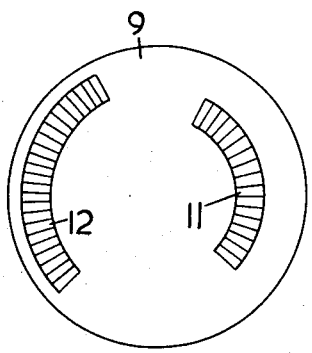
Figure 10 is a view corresponding to Figure 4 but showing a modification.
Figure 11:
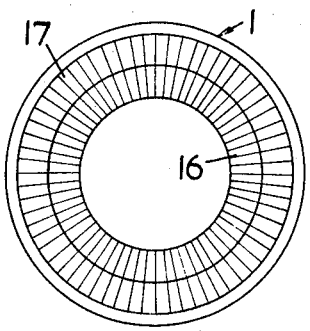
Figure 11 is a view corresponding to Figure 3 but showing a modification employed in association with that shown in Figure 10.
Figure 11A:
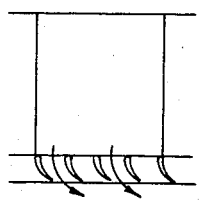
Figures 11A and 11B, are diagrams showing examples of turbine rotor blading suitable for the construction shown in Figure 11.
Figure 11B:
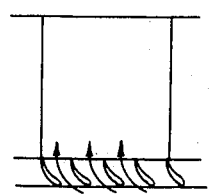

Figures 10 and 11 show a modification which permits the attainment of a higher blading efficiency having regard to the fact that in an arangement according to Figure 8 the transfer gas flows through the rotor blading first in one direction and then in the other. In order to get over this difficulty the arms 11, 12 of stator blading may be arranged at different radii as shown in Figure 10, and the rotor is provided with two concentric sets of rotor blading 16, 17, the stator blading 11 and rotor blading 16 being so designed as to match for a gas flow in one direction, while rotor blading 17 and stator blading 12 is so designed as to match for a gas flow in the other direction. In operation it will be readily understood that the particular rotor blading not in use will be masked by the imperforate portion of the plate 9. Figures 11A and 11B are sectional diagrams respectively showing the rotor blading 16 and 17.

Figure 12:
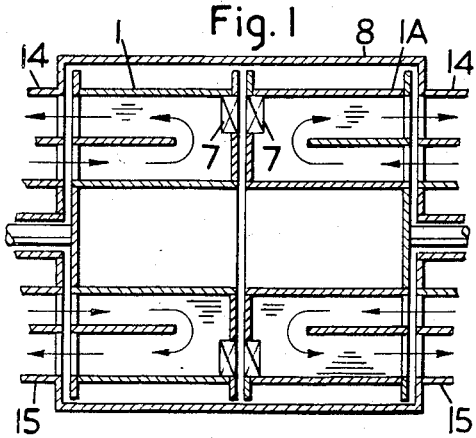
Figure 12 is an axial section through a pressure exchanger using a pair of contra-rotating rotors and is taken on a sectional plane corresponding to that of Figure 7.

The machine shown in Figure 12 comprises a pair of contra-rotating rotors 1, 1a, mounted for rotation in opposite directions in casing 8. In this case there are no pipes corresponding to 13 and the flow of transfer gas (see arrows T, Figure 13) is directly from the expansion cells of one rotor into the compression cells of the other rotor, the clearance between the rotors being just sufficient for working purposes, and to minimize leakage, the operation of this kind of machine being more fully described in the specification of applicant's copending application Serial No. 166,284.

Figure 13:
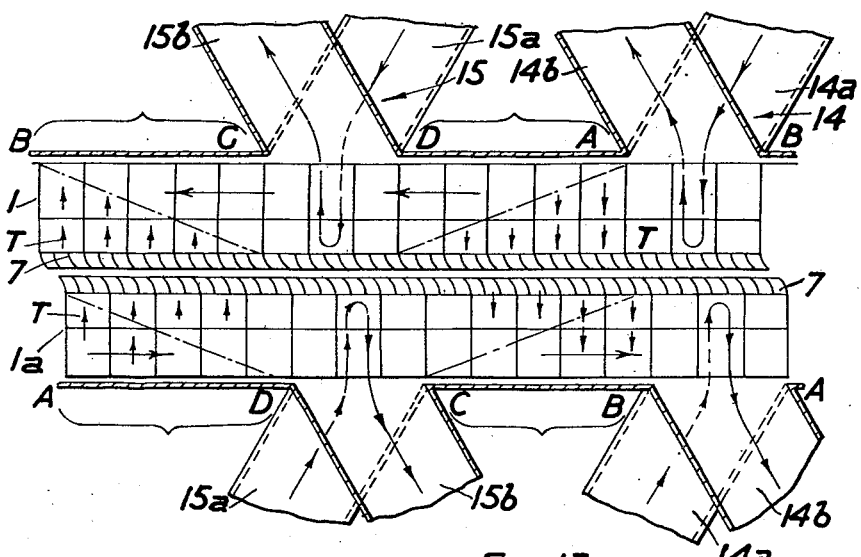
Figure 13 is a diagram showing a development of the rotor in Figure 12 in a circumferential plane.
Figure 14:
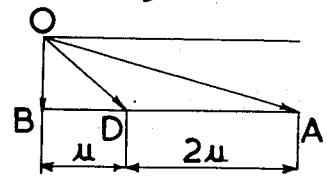
Figure 14 is a velocity diagram corresponding to the turbine blading shown in Figure 13.

A high pressure scavenging duct 14 is provided at each end and similarly there is a low pressure scavenging duct 15 at each end. As shown each rotor is provided with turbine rotor blading 7. In this case it will be observed that there is no corresponding stator blading and since the gas is to flow successively in opposite directions for the same design of rotor blading a high degree of efficiency is not to be expected. Figure 13 shows a typical section of blading suitable for this kind of machine and Figure 14 is a typical velocity diagram for the blading shown in Figure 13, the notation being as follows:

U—peripheral speed
OA—velocity of gas relative to gas I when leaving
OD—velocity of gas relative to rotor II when entering same
OB—velocity relative to rotor II of gas entering the cells, after leaving the rotor blades.

Figure 12A:
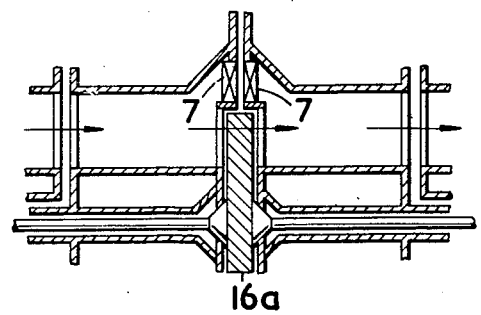
Figure 12A shows a modification of Figure 12 to embody the special feature shown in Figure 1.

Figure 12A shows a modification of Figure 12 to embody the special feature of Figure 9A i. e. the rotor blades 7 are located in diametrically enlarged portions of the rotor drums in order to permit the use of straight-through axial scavenging. A stationary partition 16A between the rotors is provided with openings to permit the flow of scavenging gas in the direction shown by the arrows.

Figure 4:
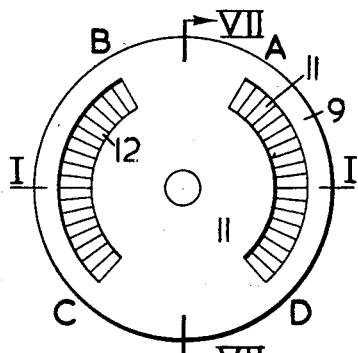
Figure 4 is a similar section on the line IV—IV in Figure 1.
Figure 5:
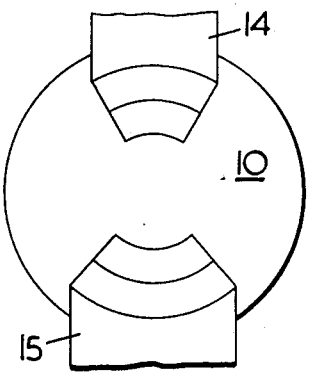
Figure 5 is a similar section on the line V—V in Figure 1.
Figure 6:
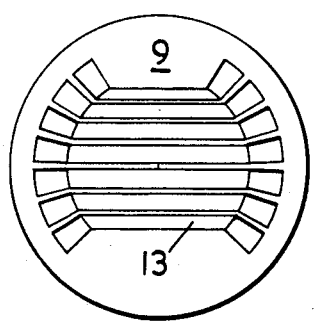
Figure 6 is an end view from the left hand side of Figure 1.
Figure 15A:
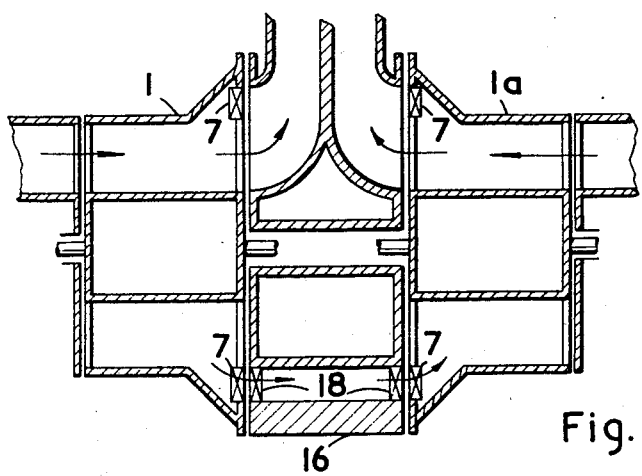
Figure 15A represents a combination of Figure 15 with Figure 9A.
Figure 17:
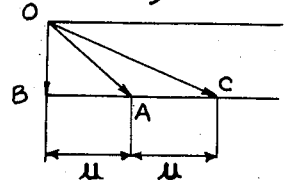
Figure 17 is a velocity diagram corresponding to the turbine blading shown in Figure 16.
Figure 15:
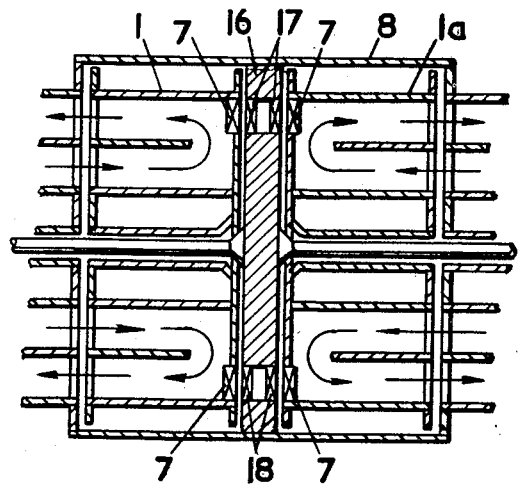
Figure 15 is a section similar to Figure 12 but showing a pressure exchanger using a pair of contra-rotating rotors which are separated by a non-rotary partition.
Figure 16:
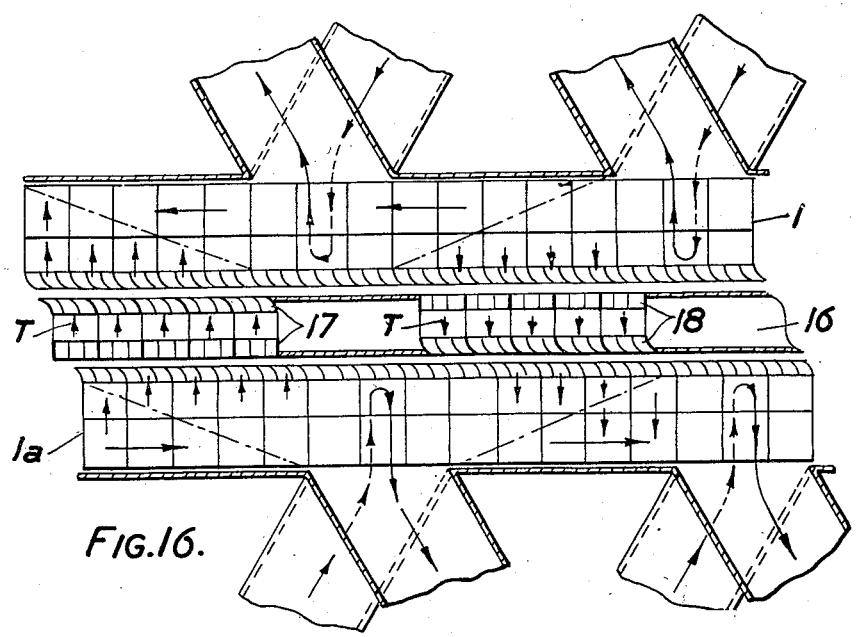
Figure 16 is a diagram showing a development of the rotor in Figure 15 in a circumferential plane.

In order to obtain a higher blading efficiency in a two rotor machine the arrangement shown in Figures 15 and 16 may be adopted in which the contra-rotating rotors 1, 1a are separated by a non-rotary partition 16 carrying arcs of stator blading 17, 18 functionally similar to the blading 11, 12 of Figure 4. In Figure 15 the upper half is a section through a scavenging stage and the lower half is a section through compression and expansion stages. The blading 17, 18 may as shown in Figure 15 each comprise two rows of blading. Figure 17 is a typical velocity diagram for the blading shown in Figure 16, the notation being as follows:

U—peripheral speed
OA—velocity of gas relative to rotor I when leaving
OB—velocity of gas relative to intermediary part (stator) when emerging from rotor I
OC—velocity of gas relative to intermediary part when leaving same and entering rotor II
OA—velocity of gas relative to rotor II when entering same
OB—velocity relative to rotor II of gas entering the cells, after leaving the rotor blades.

Figure 15A shows a construction which has some practical advantages, and which, in substance comprises the combination with Figure 15 of the special feature shown in Figure 9A.

Figure 18:
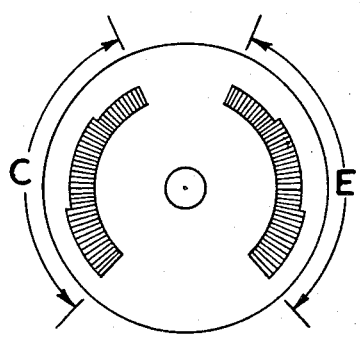
Figure 18 is a view corresponding to Figure 4 but showing a further modification.

In cases where stator blading is employed it is advantageous for reasons arising from differing gas densities so to contrive matters that the compression and expansion cells adjacent the high pressure zone are placed in communication by way of stator blading of which the gas passages are of smaller cross-sectional area than those adjacent the low pressure zone. An example of this is shown in Figure 18 in which E represents the expansion stage and C represents the compression stage, the pressure in expansion cells diminishing in the direction of the arrow at E and the pressure in the compression cells increasing in the direction of the arrow at C. As shown the desired result is achieved by making the span of the stator blading 11, 12 diminish by steps in the circumferential direction from the low pressure to the high pressure zone. As an alternative the span of such blading may obviously be made to diminish progressively and not by steps. In order to raise the efficiency of the blading the co-operating rotor blades may comprise sections of different designs located at different radial stations so as more appropriately to co-operate with stator blading of a particular span. The different sections of rotor blading may be separated by cylindrical partition rings or the equivalent which have the effect of more effectively canalising the fluid flow appropriate to a particular section of rotor blading.

Various modifications of the above described examples readily suggest themselves and in particular the construction of Figure 15 may advantageously include the features shown in Figures 10 and 11.

By reason of the mechanical energy obtained by expanding the transfer gas in turbine blading pressure exchanges may be constructed in which the rotors are self-driving. It is however possible that a surplus of shaft power may be available and which may find a useful application in driving auxiliaries such as scavenging fans. The design of a particular machine may be such that the total work done is divided in any desired proportion between the provision of a supply of compressed gas for external use, and shaft power extracted from the turbine blading in which transfer gas is expanded. In an extreme case the whole of the work may be in the form of shaft power and no compressed gas be delivered for external use.

It will be appreciated by those conversant with the art that there will necessarily be a difference between the pressure in a cell about to be scavenged and the pressure of the fresh gas at high or low pressure which effects the scavenging. In other words it is never possible to compress the gas under compression up to the highest pressure of the cycle nor is it possible to expand the gas in the expansion cells down to the lowest pressure of the cycle. This means that at the scavenging stages there will necessarily be a rush of gas (involving free expansion and therefore energy loss), either into or out of the cells. By an extension of the fundamental idea underlying the present invention it is proposed so to contrive matters that each cell after leaving a compression or expansion stage and before reaching the scavenging stage is placed into communication by way of the turbine blading above described with the scavenging duct (for the entry of fresh gas at high or low pressure as the case may be), so that the pressure in such cell is brought to the scavenging pressure before it reaches the scavenging cell, such equalisation of pressure involving expansion of gas in the turbine blading and hence more useful work.

Figure 19:
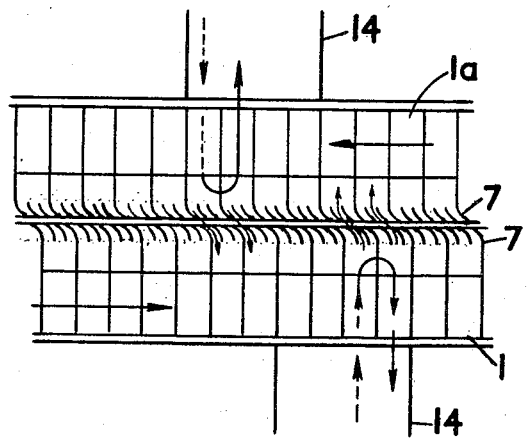
Figure 19 is a development into a circumferential plane in Figure 12 and shows a further optional feature of the invention.

Figure 19 shows a method of achieving this end in two rotor machines of the kind shown in Figure 12. From Figure 19 it will be observed that the high pressure scavenging duct 14 for the rotor 1a is circumferentially staggered with reference to the duct 14 appropriate to the rotor 1. It will be assumed that the extreme right hand cell of the rotor 1a has been brought to as high a pressure as possible by the transfer of gas from expansion cells but is still at a pressure lower than the fresh high pressure gas lead to the rotor by the ducting 14. The cell in travelling towards the left from the position shown in the drawing to the position in which it is scavenged, comes into communication by way of the blading 7 with cells in the rotor 1 which are then being scavenged. Thus the pressure in the cell of rotor 1a is raised to substantial equality with the pressure of fresh gas introduced by the duct 14. This involves a flow of gas through the blading 7 from rotor 1 to rotor 1a, as shown and consequently the expansion of that gas in the blading. Similarly a cell at the left hand side of rotor 1 in travelling towards the right to the position in which it is scavenged will be raised to the highest pressure of the cycle by communicating through the blading 7 with cells in the rotor 1a which are then being scavenged, with the result that gas passes through the blading 7 from rotor 1a to rotor 1 and is expanded in such blading (see small arrows in Figure 19).

A similar effect may if desired be produced at the low pressure scavenging by staggering the scavenging ducts. In this case however, it will be understood that the cells approaching the scavenging phase will require to be lowered in pressure.

Figure 20:
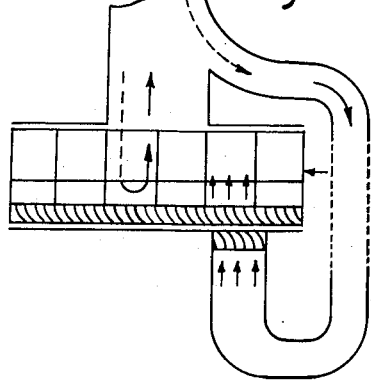
Figure 20 is a view largely similar to Figure 19 showing an application to a single rotor machine of the feature shown in Figure 19.

Figure 20 shows methods of achieving the same result in a single rotor machine of the kind shown in Figure 1. In Figure 20 there is provided a by-pass duct 18 which places each cell into communication with the incoming fresh high pressure gas before the cell reaches the scavenging zone, so that there is a flow of gas from the end of the duct 18 through the rotor blading 7 into the cells, thus equalising the pressure and effecting useful work. Stator blading 19 is provided in the open end of the duct 18. As an alternative, instead of the duct 18, a duct 18A may be provided placing the cell about to be scavenged with a cell which is being scavenged. There is appropriate stator blading 19 at each end of the duct 18A.

What I claim is:

1. A pressure exchanger in which compression of gas is effected by the simultaneous expansion of gas from a higher pressure, comprising a rotatable part, a stationary part associated therewith, turbine blading carried by said rotatable part, shaft means drivingly connected to said rotatable part to effect rotation thereof, one of said parts comprising a cell unit with angularly arranged cells and the other part comprising separate gas passages communicating with the cell unit to convey gas to, from and between cells, a plurality of said gas passages during said relative rotation momentarily forming an interconnecting path between pairs of cells for gas flow, said turbine blading having at least one blade positioned in the path of and dividing said momentary gas flow.

2. A pressure exchanger in which compression of gas is effected by the simultaneous expansion of gas from a higher pressure, comprising a rotatable cell unit with annularly arranged cells, a stationary part associated therewith, turbine blading carried by said rotatable cell unit, shaft means drivingly connected to said cell unit to effect rotation thereof, said stationary part comprising separate gas passages communicating with said cell unit to convey gas to, from and between cells, a plurality of said gas passages during rotation of said cell unit momentarily forming an interconnecting path between pairs of cells for gas flow, said turbine blading having at least one blade positioned in the path of and dividing said momentary gas flow.

3. A pressure exchanger in which compression of gas is effected by the simultaneous expansion of gas from a higher pressure, comprising a rotatable part, a stationary part associated therewith, turbine blading carried by the said rotatable part, stator blading carried by the said stationary part and positioned in cooperation with the said rotor blading, shaft means drivingly connected to the said rotatable part to effect rotation thereof, one of said parts comprising a cell unit with annularly arranged cells, the other part comprising separate gas passages communicating with the cell unit to convey gas to, from and between cells, a plurality of gas passages during said rotation momentarily forming an interconnecting path between pairs of cells, said turbine blading having at least one blade positioned in the path of and dividing said momentary gas flow.

4. A pressure exchanger as claimed in claim 3 in which the stator blading is of different radial length at different circumferential stations to provide gas paths of different cross-sectional area, said stator blading of smaller radial length providing inter-blade paths of smaller cross-sectional area and interconnecting cells at a higher pressure, said stator blading of larger radial length providing inter-blade paths of larger cross-sectional area and interconnecting cells at a lower pressure.

5. A pressure exchanger as claimed in claim 3 comprising two sets of concentrically arranged turbine blading forming part of said rotatable part, one of said sets permitting gas flow in one direction and the other of said sets providing for gas flow in the opposite direction, two sets of concentrically arranged stator blading, one of said stator blading sets matches with one set of turbine blading for a gas flow in the appropriate direction and the other of said stator blading sets matches with said other set of turbine blading for a gas flow in the opposite direction.

6. A pressure exchanger as claimed in claim 5 in which said two sets of turbine blading are arranged on concentric arcs of different radius and each set of stator blading is arranged on an arc having a radius corresponding to that of one of the sets of turbine blading.

7. A pressure exchanger in which compression of gas is effected by the simultaneous expansion of gas from a higher pressure, comprising a rotatable cell unit with annularly arranged cells, a stationary part associated therewith, turbine blading carried by said rotatable cell unit, shaft means drivingly connected to said cell unit to effect rotation thereof, said stationary part comprising ducting communicating with said cell unit to convey gas to and from said cells and further ducting forming interconnecting paths between pairs of cells positioned at opposed ends of a chord of said cell unit through which gas may be conveyed, said turbine blading having at least one blade positioned in the path of and dividing gas flow between a pair of cells.

8. A pressure exchanger as claimed in claim 7 in which stator blading is positioned intermediate said interconnecting ducting and said turbine blading.

9. A pressure exchanger in which compression of gas is effected by the simultaneous expansion of gas from a higher pressure, comprising a pair of contra-rotatable substantially coaxially mounted cell units each having annularly arranged cells, a stationary part associated therewith, turbine blading carried by at least one of said cell units, shaft means drivingly connected to said cell units to effect contra-rotation thereof, said stationary part comprising ducting communicating with said cell units to convey gas to and from said cells, an apertured partition positioned between said cell units and forming momentarily during contra-rotation of said cell units gas flowing passages between pairs of cells each of which constitutes a cell from each cell unit, said turbine blading having at least one blade positioned in the path of and dividing gas flow between a pair of cells.

10. A pressure exchanger as claimed in claim 9 in which stator blading is carried by said apertured partition and cooperates with said turbine blading.

References Cited in the file of this patent

UNITED STATES PATENTS

| | | |
|---|---|---|
| 2,045,152 | Libre | June 23, 1936 |
| 2,399,394 | Seippel | Apr. 30, 1946 |
| 2,526,618 | Darrieus | Oct. 24, 1950 |